Patented Oct. 27, 1942

2,300,134

UNITED STATES PATENT OFFICE 2,300,134

PROCESS FOR THE SEPARATION OF TRANS-OESTRADIOL AND PRODUCT OBTAINED THEREBY

Hans Priewe, Rangsdorf, Teltow, near Berlin, Germany, assignor to Schering Corporation, Bloomfield, N. J., a corporation of New Jersey No Drawing. Application February 8, 1940, Serial No. 317,887. In Germany January 17, 1939

13 Claims. (Cl. 260—397.5)

The present invention relates to the isolation of trans oestradiol from mixtures containing the same, and particularly from mixtures of oestrogenic substances.

It is already known that it is possible to separate trans oestradiol from other oestrogenic substances, for example, di-hydroequilin, by precipitation methods, as by precipitation by means of alkaloids or saponins (see, for example, the application of Serini and Logemann, Serial No. 203,822, filed April 23, 1938).

I have found that trans-oestradiol can be separated not only from cis-oestradiol, but also from other oestrogenic substances contained in variously available mixtures, such as oestrone, equilin, equilenin, di-hydro-equilin, and di-hydro-equilenin, in more simple fashion than by precipitation by means of alkaloids or saponins, and can be isolated in good yield in the form of a product of very high purity by converting it, by means of urea, into a difficultly soluble compound in the proportion of 1 mol of urea to 1 mol of trans-oestradiol. The other oestrogenic hormones are not capable of forming such a difficultly soluble compound with urea, and can therefore be separated upon the basis of the differences in solubility of the compounds. The process can be advantageously conducted in such manner that the solution of the oestrogenic substances is treated up to saturation with urea or urea solutions. However, the solid mixture of active substances can also be crystallized out of an approximately saturated urea solution in organic solvents. Finally, the solid starting mixture can also be treated with as saturated an aqueous urea solution as possible, and from the so-obtained reaction product the active substances which did not react with the urea can be extracted with organic solvents which are not miscible with water and are practically non-solvents for the urea.

The so-obtained trans-oestradiol-urea compound is almost insoluble in a cold saturated urea solution in water, or in organic solvents miscible with water, such as methyl alcohol, ethyl alcohol, acetone, dioxane, and the like; it is, however, split into its components even by cold water. This splitting occurs partially also in warm saturated aqueous urea solution, while the molecular compound can be easily crystallized out of a solution of urea in organic, water-miscible solvents.

As mentioned above, the reaction product can be split into its components in simple fashion by treatment with warm water, the urea going into solution, while the trans-oestradiol remains behind in very pure form.

From the solution of the residual hormones remaining from the manufacture of the trans-oestradiol-urea compound, the residual hormones can be recovered in known manner. If the hormones were dissolved in the urea solution, any organic solvent that may be present is first removed by evaporation and from the residue so obtained the excess urea is dissolved out by treatment with a large quantity of water or aqueous salt solutions, and if desired, small quantities of any hormones that have likewise been dissolved out can be extracted from these aqueous solutions. Most surprisingly, it has been found that upon removal of the urea by treatment with water, a part of the oestrogenic substances passes over into such solution and can be recovered therefrom, for example, by salting out with ammonium sulphate. These active substances have the property of dissolving in water even in the cold and of thereby yielding aqueous, injectible hormone solutions with 1000 R.U./cc. and higher. Heretofore it was not possible to obtain aqueous solutions of oestrogenic hormones of this strength.

The following example will serve to illustrate the invention more in detail:

Example 5.0 g. of a mixture of oestrogenic diols, such as is obtained by the hydrogenation of a crude oestrone obtained from mare's urine, are dissolved hot in 400 cc. of a methyl alcoholic urea solution which was saturated in the cold. Upon cooling, there crystallizes out the produced trans-oestradiol-urea compound in colorless rhombohedral crystals along with some urea. The double compound is filtered with suction and recrystallized from 440 cc. of a methyl alcoholic urea solution saturated in the cold. There are obtained in this way 3.3 g. of a pure double compound melting at 221° C. with decomposition. The compound is then decomposed by dissolving it in 150 cc. of water at about 80° C., the solution cooled, the precipitated trans-oestradiol (2.5 g.) filtered with suction and washed several times with a small amount of warm water. The melting point of the product is 175–176° C. $(\alpha)_D = 82.5°$.

The mother liquor separated from the double compound is then evaporated to dryness in vacuum for the recovery of the other diols, and the residue is warmed with 400 cc. of a 30% aqueous ammonium sulphate solution for removal of the urea, is then cooled, filtered with suction, and washed with a small amount of water. In this way there are obtained the residual hormones which were present in the starting material and which can be separated by fractional distillation, crystallization, sublimation, or in other known ways.

The residue obtained by evaporating the alcoholic mother liquor to dryness and containing the residual hormones can be freed from urea also by treatment with water. Surprisingly, it has been found that a part of the residual hormones goes into solution. If a salt, such as ammonium sulphate and the like, is added to these aqueous solutions, there is precipitated an active oestrogenic material which dissolves in water and yields aqueous injectible hormone solutions having a potency of 1000 R.U./cc. and even higher.

It will be obvious that my process is applicable to oestrogenic mixtures of any origin containing trans-oestradiol, and that variations from the specific proportions and procedures above set forth may be resorted to within the scope of the appended claims without departing from the spirit of the invention.

I claim:

1. Process for the separation of trans-oestradiol from oestrogenic mixtures containing the same, comprising converting the trans-oestradiol into its difficultly soluble urea compound, and separating such compound from the other components of the mixture.

2. Process for the separation of trans-oestradiol from oestrogenic mixtures containing the same, comprising dissolving the starting mixture in a hot solution of urea in an organic solvent, separating out the trans-oestradiol-urea compound precipitating on cooling, and thereafter splitting such compound into its components.

3. Process for the separation of trans-oestradiol from oestrogenic mixtures containing the same, comprising dissolving a mixture of follicular hormones containing trans-oestradiol in a hot solution of urea in an organic solvent, separating out the trans-oestradiol-urea compound precipitating on cooling, and thereafter splitting such compound into its components.

4. Process according to claim 1, wherein the mixture is treated with a solution of urea in methyl alcohol.

5. Process for the separation of trans-oestradiol from oestrogenic mixtures containing the same, comprising adding urea to a solution of the starting material up to saturation, separating the precipitated trans-oestradiol-urea compound, and decomposing it into its components.

6. Process for the separation of trans-oestradiol from oestrogenic mixtures containing the same, comprising adding urea to a heated solution of a mixture of follicular hormones, containing trans-oestradiol, up to saturation, allowing the solution to cool, separating the precipitated trans-oestradiol-urea from the solution of the remaining hormones, and splitting the urea compound into its components.

7. Process for the separation of trans-oestradiol from oestrogenic mixtures containing the same, comprising treating the starting material with an aqueous solution of a urea, extracting from the obtained reaction mixture the unreacted substances with the aid of an organic solvent which is non-miscible with water and is a non-solvent for urea, and then decomposing the undissolved trans-oestradiol-urea compound into its components.

8. Process for the separation of trans-oestradiol from oestrogenic mixtures containing the same, comprising converting the trans-oestradiol into its difficultly soluble urea compound, separating such compound from the other components of the mixture, and decomposing the separated trans-oestradiol-urea compound by treatment with warm water.

9. Process for the separation of trans-oestradiol from oestrogenic mixtures containing the same, comprising dissolving the mixture in an organic solvent, converting the trans-oestradiol into its difficultly soluble urea compound, separating such compound from the other components of the mixture, evaporating the organic solvent from the mother liquor containing the residual substances, and removing excess urea from the residue by treatment with an aqueous medium.

10. Process according to claim 9, wherein the excess urea is removed from the residue by treatment with a relatively large quantity of water.

11. Process according to claim 9, wherein the excess urea is removed from the residue by treatment with an aqueous salt solution.

12. Process for the separation of trans-oestradiol from oestrogenic mixtures containing the same, comprising preparing a solution of a mixture of follicle hormones containing trans-oestradiol, converting the trans-oestradiol contained in the mixture into its difficultly soluble urea compound, separating such compound from the other components of the mixture, treating the residual hormones with water, and isolating from the urea solution so obtained an active oestrogenic material.

13. A trans-oestradiol-urea compound.

HANS PRIEWE.